(12) United States Patent
Buyuktosunoglu et al.

(10) Patent No.: US 7,865,747 B2
(45) Date of Patent: Jan. 4, 2011

(54) ADAPTIVE ISSUE QUEUE FOR REDUCED POWER AT HIGH PERFORMANCE

(75) Inventors: Alper Buyuktosunoglu, Rochester, NY (US); Stanley E. Schuster, Granite Springs, NY (US); David M. Brooks, Newark, DE (US); Pradip Bose, Yorktown Heights, NY (US); Peter W. Cook, Mount Kisco, NY (US); David H. Albonesi, Lima, NY (US)

(73) Assignee: International Business Machines Corporation, Armonk, NY (US)

( * ) Notice: Subject to any disclaimer, the term of this patent is extended or adjusted under 35 U.S.C. 154(b) by 1608 days.

(21) Appl. No.: 09/971,186

(22) Filed: Oct. 5, 2001

(65) Prior Publication Data

US 2002/0053038 A1 May 2, 2002

Related U.S. Application Data

(60) Provisional application No. 60/244,732, filed on Oct. 31, 2000.

(51) Int. Cl.
*G06F 1/32* (2006.01)
(52) U.S. Cl. .................................................... 713/320
(58) Field of Classification Search ................. 713/300, 713/320, 323, 324; 711/100, 108; 365/49
See application file for complete search history.

(56) References Cited

U.S. PATENT DOCUMENTS

| 4,758,982 | A | * | 7/1988 | Price ............................ 711/108 |
| 5,283,882 | A | * | 2/1994 | Smith et al. .................... 365/49 |
| 5,475,825 | A | * | 12/1995 | Yonezawa et al. ............... 711/1 |
| 5,499,204 | A | * | 3/1996 | Barrera et al. ................. 365/49 |
| 5,542,067 | A | * | 7/1996 | Chappell et al. ............ 711/167 |
| 5,627,983 | A | * | 5/1997 | Popescu et al. ............. 712/217 |
| 5,835,435 | A | * | 11/1998 | Bogin et al. ................. 365/227 |
| 6,049,882 | A | * | 4/2000 | Paver .......................... 713/322 |
| 6,202,130 | B1 | * | 3/2001 | Scales et al. ................. 711/137 |
| 6,205,537 | B1 | | 3/2001 | Albonesi |
| 6,493,790 | B1 | * | 12/2002 | Khieu et al. ................. 711/108 |
| 2002/0049918 | A1 | * | 4/2002 | Kaxiras et al. .............. 713/300 |

FOREIGN PATENT DOCUMENTS

EP        350055 A2 *   1/1990

OTHER PUBLICATIONS

Johnson, M., "Superscaler Microprocessor Design", 1991, P T R Prentice Hall, pp. 21-22 and 41-48.*

(Continued)

*Primary Examiner*—Thomas Lee
*Assistant Examiner*—Eric Chang
(74) *Attorney, Agent, or Firm*—McGinn IP Law Group, PLLC

(57) ABSTRACT

A method and structure of reducing power consumption in a microprocessor includes at least one storage structure in which the activity of the storage structure is dynamically measured and the size of the structure is controlled based on the activity. The storage structure includes a plurality of blocks, and the size of the structure is controlled in units of block size, based on activity measured in the blocks. An exemplary embodiment is an adaptive out-of-order queue.

32 Claims, 11 Drawing Sheets

OTHER PUBLICATIONS

Powell, M.; Se-Hyun Yang; Falsafi, B.; Roy, K.; Vijaykumar, T.N.;"Gated-V dd: a circuit technique to reduce leakage in deep-submicron cache memories"; Low Pwr Electronics and Des., 2000. ISLPED '00. Proc of the 2000 Intl. Symp. on; pp. 90-95.*

R. Canal, et al, "A Low Complexity Issue Logic" Proc. ACM Int'l Conference on Subcomputing (ICS), pp. 327-335, Santa Fe, N.M., Jun. 2000.

D.H. Albonesi, et al., "Dynamic IPS Rate Optimization", Proc. ISCA, pp. 282-292, Jun./Jul. 1998.

D. Folegnani et al,"Reducing Power Consumption of the Issue Logic", Proc. ISCA Workshop on Complexity Effective Design, Jun. 2000.

D. Folegnani, et al, "Energy-Effective Issue Logic", Proc. of the 28th Int. Syposium on Computer Architecture, Goteborg, Sweden, Jun. 30-Jul. 4, 2001.

G. Cai et al., "Architectural Level Power/Performance Optimization and Dynamic Power Estimation", Seminar Slides, Nov. 15, 1999.

D.H. Albonesi, "The Inherent Efficiency of Complexity-Adaptive Processors", Proc. ISCA Workshop on Power-Driven Microarchitecture, Jun. 1998.

D.H. Albonesi, "Selective Cache Ways: On-Demand Cache Resource Allocation", 32nd International Syposium on Microarchitecture, Nov. 1999.

R. Balasubramonian et al, "Memory Hierarchy Reconfiguration for Energy and Performance in General-Purpose Processor Architctures", 33rd International Symposiumon Microarchitecture, Dec. 2000.

S. Palacharla et al, "Complexity-Effective Superscalar Processors", Proc. of the Internatioanl Synposium on Computer Architecture, 1997, pp. 206-218, Jun. 1997.

K.J. Schultz "Content-Addressable Memory Core Cells A Survey", in Integration, the VLSI Journal, vol. 23, pp. 177-188, Elsevier Press, 1997.

* cited by examiner

| ISSUE QUEUE NUMBER OF ENTRIES | TRANSISTOR COUNTS ISSUE QUEUE | TRANSISTOR COUNTS SHUTDOWN LOGIC | COMPLEXITY OF SHUTDOWN LOGIC |
|---|---|---|---|
| 16 | 28820 | 802 | 2.8% |
| 32 | 57108 | 1054 | 1.8% |
| 64 | 113716 | 1736 | 1.5% |
| 128 | 227092 | 2530 | 1.1% |

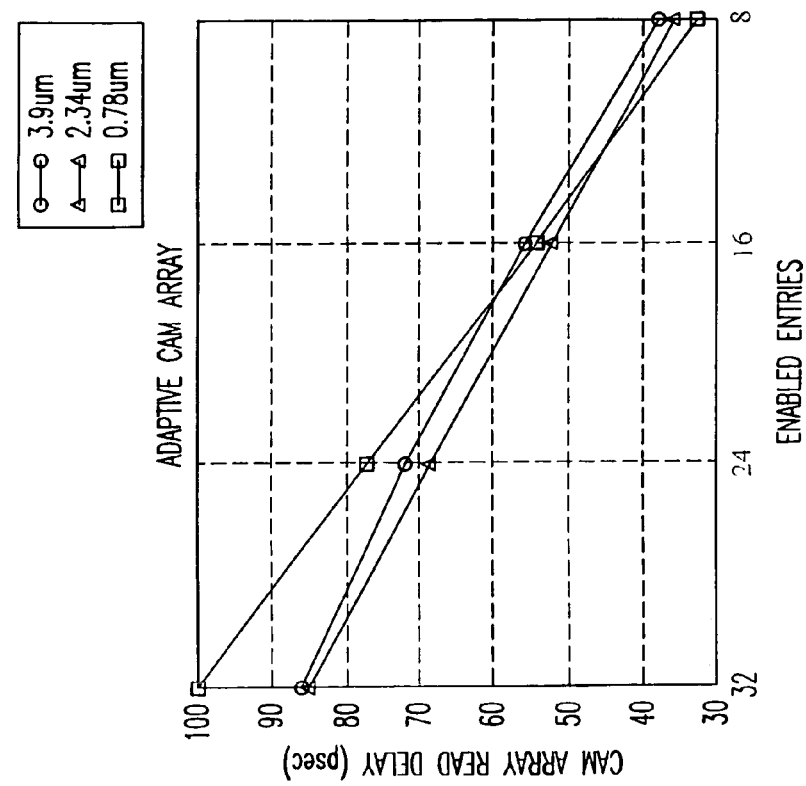
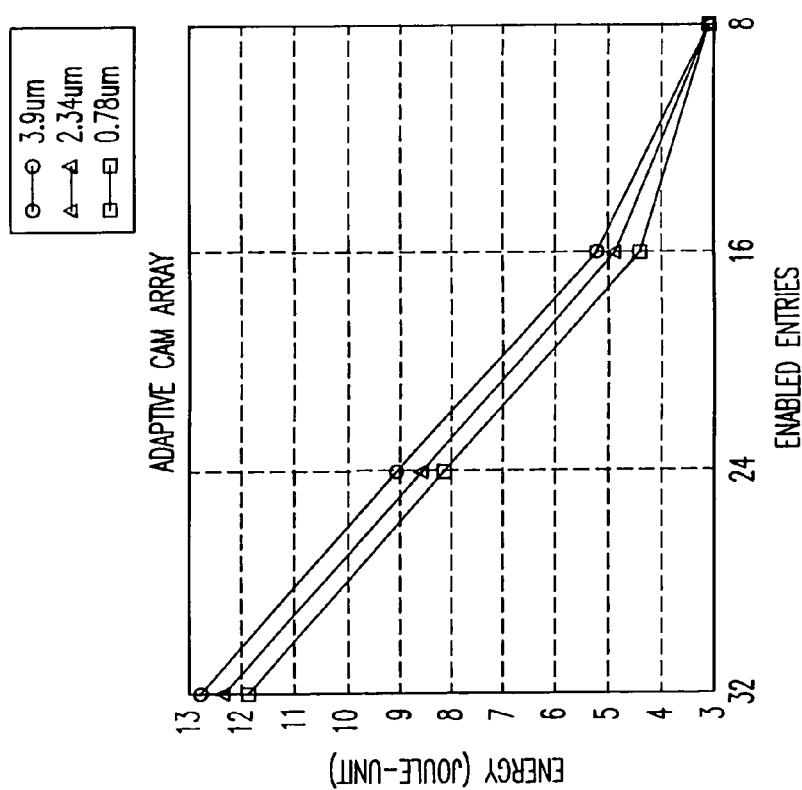
FIG. 8

| FACTOR | CYCLE WINDOW | | BZIP | GCC | MCF | PARSER | VORTEX | VPR | AVERAGE |
|---|---|---|---|---|---|---|---|---|---|
| 0.9 | 2K | CPI DEGRADATION % | 0.0 | 0.8 | 0.3 | 0.9 | 4.4 | 0.0 | 1.1 |
| | | POWER SAVINGS % | 11.6 | 36.1 | -2.8 | 5.6 | 44.7 | -0.3 | 15.8 |
| | 4K | CPI DEGRADATION % | 0.0 | 1.1 | 0.1 | 0.9 | 4.8 | 0.0 | 1.1 |
| | | POWER SAVINGS % | 13.9 | 40.9 | -0.5 | 6.2 | 45.8 | -0.2 | 17.7 |
| | 8K | CPI DEGRADATION % | 0.0 | 1.4 | 0.3 | 0.9 | 3.3 | 0.1 | 1.0 |
| | | POWER SAVINGS % | 14.0 | 42.8 | -3.0 | 6.3 | 43.6 | -2.6 | 16.9 |
| | 16K | CPI DEGRADATION % | 0.0 | 1.5 | 0.2 | 0.9 | 2.9 | 0.0 | 0.9 |
| | | POWER SAVINGS % | 11.9 | 44.1 | -3.0 | 5.4 | 44.8 | 7.6 | 18.5 |
| 0.8 | 2K | CPI DEGRADATION % | 0.0 | 2.8 | 0.7 | 1.6 | 5.8 | 0.0 | 1.8 |
| | | POWER SAVINGS % | 13.5 | 47.1 | 7.2 | 12.6 | 51.0 | 15.2 | 24.4 |
| | 4K | CPI DEGRADATION % | 0.0 | 4.2 | 0.2 | 1.2 | 6.6 | 0.0 | 2.0 |
| | | POWER SAVINGS % | 15.9 | 52.5 | 22.5 | 10.9 | 53.8 | 19.7 | 29.2 |
| | 8K | CPI DEGRADATION % | 0.0 | 4.2 | 0.3 | 1.0 | 4.8 | 0.0 | 1.7 |
| | | POWER SAVINGS % | 15.9 | 53.7 | -3.0 | 9.0 | 50.9 | 14.8 | 23.6 |
| | 16K | CPI DEGRADATION % | 0.0 | 5.7 | 0.2 | 0.9 | 4.7 | 0.0 | 1.9 |
| | | POWER SAVINGS % | 14.0 | 55.6 | -3.0 | 8.5 | 52.5 | 11.0 | 23.1 |
| 0.7 | 2K | CPI DEGRADATION % | 0.0 | 7.0 | 0.9 | 1.7 | 7.2 | 0.8 | 2.9 |
| | | POWER SAVINGS % | 17.0 | 57.0 | 25.2 | 17.3 | 56.8 | 29.6 | 33.8 |
| | 4K | CPI DEGRADATION % | 0.0 | 8.4 | 0.1 | 1.7 | 8.2 | 0.3 | 3.1 |
| | | POWER SAVINGS % | 17.1 | 60.4 | 22.5 | 17.0 | 60.2 | 28.3 | 34.3 |
| | 8K | CPI DEGRADATION % | 0.0 | 8.6 | 0.3 | 1.7 | 6.8 | 1.6 | 3.2 |
| | | POWER SAVINGS % | 26.7 | 61.3 | -3.0 | 13.9 | 58.1 | 34.7 | 32.0 |
| | 16K | CPI DEGRADATION % | 0.0 | 8.7 | 0.2 | 1.7 | 8.2 | 1.0 | 3.3 |
| | | POWER SAVINGS % | 15.2 | 61.8 | -2.9 | 15.5 | 62.2 | 24.1 | 29.3 |

FIG.12

ADAPTIVE ISSUE QUEUE FOR REDUCED POWER AT HIGH PERFORMANCE

CROSS-REFERENCE TO RELATED APPLICATIONS

The present application claims priority to Provisional U.S. Patent Application No. 60/244,732, filed Oct. 31, 2000, by Alper Buyuktosunoglu, Stanley E. Schuster, David M. Brooks, Pradip Bose, Peter W. Cook, David H. Albonesi, herein incorporated by reference in its entirety.

BACKGROUND OF THE INVENTION

1. Field of the Invention

The present invention generally relates to reducing power consumption in microprocessor functional modules inherently requiring dedicated memory, buffer or queue resources. Such power reduction is achieved without appreciable performance loss, as measured using instructions per cycle (IPC), or significant additional hardware.

Specifically, dynamic statistics are gathered for the functional module activity and, depending on need or activity, the module is adaptively sized down or up in units of a predetermined block or chunk size. An exemplary embodiment addresses an out-of-order issue queue in high-end super scalar processors.

2. Description of the Related Art

Increasing power dissipation has become a major constraint for future performance gains in the design of microprocessors. This invention is a solution to the problem of reducing power consumption, without appreciable IPC-centric performance loss, while concurrently even providing the opportunity of a module-specific clock speed increase, or alternatively a module-specific power reduction via voltage scaling. The specific embodiment herein described addresses an out-of-order issue queue of a superscalar processor, but the approach lends itself to other specific functional modules.

A non-pipelined scalar processor is one that issues and processes one instruction at a time. Each such instruction operates on scalar data operands, and each such operand is a single or atomic data value or number. Pipelining within a scalar processor introduces concurrency in processing multiple instructions in a given clock cycle, while preserving the single-issue paradigm. In contrast, a vector processor, also known as an array or SIMD (single instruction, multiple data) processor, is one that can perform an operation on an entire array of numbers in a single architectural step or instruction. Cray supercomputers are vector processors. They have machine instructions that can, for example, add each entry of array A to the corresponding entry of array B and store the result in the corresponding entry of array C.

A superscalar processor is in between the scalar processor and vector processor architectures. It accepts instructions like those of a scalar processor but has the ability to fetch, issue and execute multiple instructions in a given machine cycle. In addition, each instruction execution path is usually pipelined to enable further concurrency. IBM's Power/PowerPC™ processors, Intel's PentiumPro (P6)™ processor family, Sun's Ultrasparc™ processors, Compaq's Alpha™ family and HP's PA-RISC™ processors are all examples of superscalar processors.

In the superscalar processor architecture, the purpose of the issue queue is to receive instructions from the dispatch stage and forward "ready instructions" to the execution units. Such an issue queue in high-end super scalar processors, such as the current IBM Power4™ machine, typically burns a lot of power, because: (a) the queue is implemented using a continuously clocked array of flip-flops and latches (b) instructions are issued (out of order with respect to the original sequential program semantics) in a given cycle. So the required issue logic is quite complex, requiring run-time dependence checking logic. Also, as discussed in greater detail below, "holes" in the queue left by instructions that have been issued are filled up in the subsequent cycle, by a "shift and compact" strategy, which is quite an energy-consuming task. In addition, since the queue size is fixed and the latches are continuously clocked, such an implementation inherently wastes a lot of energy by not exploiting the dynamically changing requirements of the executing workload.

Two schemes by Gonzalez et al. at UPC, Barcelona, Spain, addressed the problem of power and/or complexity reduction in issue queues without significantly impacting the IPC performance (see R. Canal and A. Gonzalez, "A low-complexity issue logic", Proc. ACM Int'l. Conference on Supercomputing (ICS), pp. 327-335, Santa Fe, N.M., June, 2000; and D. Folegnani and A. Gonzalez, "Reducing the power consumption of the issue logic", Proc. ISCA Workshop on Complexity-Effective Design, June, 2000). The first scheme reduces the complexity of the issue logic by employing an additional separate "ready queue" which holds only instructions with operands that are determined to be fully available at decode time. Thus, instructions can be issued "in-order" from this "ready queue" at reduced complexity without associative lookup. A separate "first-use" table is used to hold instructions, indexed by unavailable operand register specifiers. Only those instructions that are first-time consumers of these pending operands are stored in this table. Instructions that are deeper in the dependence chain simply stall or are handled separately through a separate issue queue. The dependence link information connecting multiple instances of the same instruction in the "first-use" table is updated after each instruction execution is completed. At the same time, if a given instruction is deemed to be "ready" it is moved to the in-order ready queue. Since none of the new structures require associative lookups or run-time dependence analysis and yet instructions are able to migrate to the ready queue as soon as the operands become available, this scheme significantly reduces the complexity of the issue logic. However, it is not clear whether the net energy consumed is reduced by using this method. In fact, there could be an overall increase in power consumption due to the additional queues.

The second approach relies on static scheduling. Here the main issue queue only holds instructions with pre-determined availability times of their source operands. Since the queue entries are time-ordered due to known availabilities, the issue logic can use simple, in-order semantics. Instructions with operands which have unknown availability times are held in a separate "wait queue" and get moved to the main issue queue only when those times become definite.

In both approaches, the emphasis is on reduction of the complexity of the issue control logic. The added, or augmented, support structures in these schemes may actually cause an increase of power, in spite of the simplicity and elegance of the control logic. In the second scheme, a major focus is purportedly on power reduction. The issue queue is designed to be a circular queue structure with head and tail pointers, and the effective size is dynamically adapted to fit the ILP content of the workload during different periods of execution.

In both schemes, Gonzalez et al show that the IPC loss is very small with the suggested modifications to the issue queue structure and logic. Also, in the second scheme, a trace-driven power-performance simulator, based on the model by Cai (G. Cai, "Architectural level power/performance optimization and dynamic power estimation", in Proceedings of the CoolChips Tutorial, in conjunction with Micro-32, 1999), is used to report substantial power savings on dynamic queue sizing. However, a detailed circuit-level design and simulation of the proposed implementations are not reported in either approach. Without such analysis, it is difficult to gauge the cycle-time, i.e., clock frequency, impact or the extra power/complexity of the augmented design.

In the second scheme, the main focus is indeed power reduction and the approach employed is similar in spirit to our invention, in that the queue size is dynamically altered. However, the method used is completely different from the approach in this invention nor do the developers describe any circuit-level implementation. It is more of a concept paper, limited to micro architectural design concepts. Also, in this design a circular queue structure, based on flip-flops is implied, whereas the current invention uses a CAM/RAM based design as the building block.

The prior work by Albonesi et al. ("Dynamic IPC/Clock Rate Optimization", D. H. Albonesi, Proc. ISCA-25, pp. 282-292, June/July, 1998; "The Inherent Energy Efficiency of Complexity-Adaptive Processor", D. H. Albonesi, Proc. ISCA Workshop on Power-Driven Microarchitecture", June, 1998) is based on the principle of dynamic adaptation, but applied specifically to cache and memory hierarchy design. In that work, there is also reference to possibly applying adaptation techniques to other structures, like instruction queues, but without describing any implementation details. In the paper titled: "Dynamic IPC/Clock Rate Optimization," there is no description of the hardware control mechanism used to make reconfiguration decisions or actual size and geometry changes. In terms of the suggested implementation, the work reported is based upon the use of repeater circuits, that are used to dynamically resize the cache array. This is quite different in content and context, when compared to the out-of-order issue queue design to be shortly discussed as used in the present invention. In concept, the reconfiguration decision in this paper by Albonesi is based on the metric TPI (time per instruction), computed as the cycle time divided by IPC. In particular, for the reconfigurable cache design, the metric monitored during adaptation was the average TPI due to cache misses. U.S. Pat. No. 6,205,537 to Albonesi further discusses the content of that paper.

By contrast, in the present invention, as will be explained shortly, the primary decision logic used in adapting the issue queue size is based on monitoring the activity of the issue queue during a cycle window. The IPC (instructions per cycle) is monitored as a guard mechanism to override the primary reconfiguration decision to avoid large performance shortfalls. Thus, in our invention, the reconfiguration decision is based on a combination of activity measurement and IPC history.

The paper by Albonesi ("Selective Cache Ways: On Demand Cache Resource Allocation", D. Albonesi, 32nd International Symposium on Microarchitecture, November, 1999) is again focused on cache design; but this paper proposes the disabling of inactive cache ways to save power in a set-associative design. The partitioning of the cache array and directory into "ways" is a natural part of set-associative cache design. This is quite unlike an issue queue design, which is normally not partitioned into substructures. Albonesi's power-efficient design proposal, in this case, leverages an existing partitioned array organization and adds the necessary logic needed to selectively disable sub-arrays, when the resultant performance loss is deemed to be within a pre-defined acceptance level. More explicitly, the disable/enable decisions in this design are based on a metric termed PDT or performance degradation threshold. The PDT signifies the allowable margin of performance loss in a disablement decision. Exact logic and circuit implementations to use PDT in a reconfiguration decision are not discussed in this paper.

In the paper "Memory Hierarchy Reconfiguration . . ." (R. Balasubramonian, D. H. Albonesi, A. Buyuktosunoglu, and S. Dwarkadas, "Memory Hierarchy Reconfiguration for Energy and Performance in General-Purpose Processor Architectures", 33rd International Symposium on Microarchitecture, December, 2000), these authors again propose the use of repeater insertion technology to adapt cache and TLB (translation look aside buffer) structures within a processor. Reconfiguration decision is based on phase change detection in an application along with hit and miss tolerance metrics. Like the original Albonesi paper on "Dynamic IPC/Clock Rate Optimization", therefore, this paper is quite different in scope and concept from the present invention.

SUMMARY OF THE INVENTION

The exemplary embodiment describes an out-of-order issue queue in high-end super scalar processors, but the concept is equally applicable, with customized adaptations of the resizing control and monitoring hardware, to other specific computer architecture modules such as the main or a specific (e.g. load-store) reorder buffer, branch prediction tables, cache and TLB (translation look aside buffer) memory structures.

In summary, a separate circuit structure gathers dynamic statistics of issue queue activity, and the issue queue is sized down or up, depending on need or activity. When the queue is sized down, a reduction in net power results. The result is an issue queue implementation that preserves high processor performance, while consuming much less average power over the execution of a workload, in which typically, the queue resource requirements vary over time.

As a side benefit, as the module is sized down, its access latency is reduced: this can be exploited to either (a) increase the (local) clock speed performance of the module or the unit containing that module; or (b) decrease the voltage of the sized-down module, to reduce power consumption.

This invention is based on a new adaptive issue queue organization. The power savings and the logic overhead have been evaluated through actual circuit level implementations and their simulations. The scheme is simpler from that described by Gonzalez in that it does not introduce any new data storage or access structure such as the first-use table or the wait queue in the critical execution path of the instruction fetch-issue-execute-finish cycle. Rather, it utilizes an existing framework such as the CAM/RAM structure commonly used in associative table look up hardware within processor, such as those associated with cache and tlb (translation look aside buffer) structures and other tabular storage. CAM is an acronym for "content-addressable memory", another term for associative memory.

The CAM/RAM structure is currently used as the basic building block in issue queue designs in processors today. For an example, the reader is referred to the issue queue wakeup logic description in the paper by Palacharla and Smith in ISCA-97. Because the CAM/RAM structure is known, details of this structure are not presented herein. However, many other processors currently do not use the CAM/RAM structure to implement their issue queues.

Additionally, the simple counter-based hardware used in the present invention to monitor queue activity operates concurrently with normal processing. As such, it does not add any extra pipeline stage to the fetch-issue-execute-finish flow. However, the effective size of the issue queue is dynamically adapted to fit the workload demands. This aspect of the design is conceptionally similar to the method of Gonzalez et al.'s second scheme discussed above but the control logic is quite different.

The approach to reducing the average power consumption is to dynamically shut down and re-enable entire blocks of the queue. A separate control circuitry monitors the activity of the issue queue over successive periods of program execution, called "cycle windows". This logic, which is counter-based, is used to gather activity-statistics. At the end of each cycle window, the "decision logic" that is part of the control circuitry, enables the appropriate control signals to shut down or activate a particular queue-block.

The design makes use of transmission gate insertion between separate blocks of the issue queue to enable such resizing. The transmission gates are controlled by a separate circuit structure that gathers dynamic statistics of issue queue activity. This control logic allows the issue queue to get sized down or up, depending on need or activity. When the queue is sized down, a reduction in net power results. The added control logic results in almost negligible (~2%) overhead, in terms of power consumption and the number of additional transistors. The result is an issue queue implementation that preserves high processor performance, while consuming much less average power over the execution of a workload, in which typically, the queue resource requirements vary over time.

The disclosed circuit-level design and implementation have been analyzed using circuit-level simulations to quantify the extent of power savings that is possible. The results show that in the specific implementation, up to 70% reduction in energy consumption can be effected compared to a full-size, fixed-sized (non-adaptive) issue queue design.

The method as disclosed in this document has the advantage that it uses a standard CAM/RAM based building block for the design which is inherently lower power than a flip-flop based design. The design is very regular, based on replicable queue block structures. In addition to power reduction, the design offers the advantage of reduced access latency when the queue is sized downward, i.e., a potential clock-speed improvement. Since net performance, i.e., instructions completed per second, is proportional to the product of clock speed and IPC, this aspect can be exploited as an overall performance advantage, a feature that is not available in Gonzalez's scheme. The design is proven to have significant power reduction potential, based on detailed circuit-level simulation. Gonzalez's work does not go into circuit-level design and as such does not report actual power savings.

It is, therefore, an object of the present invention to provide a method and structure to reduce power consumption in a processor.

It is another object of the present invention to provide a method and structure for a practical, circuit-level "monitor-and-control" hardware scheme to effect dynamic resizing of queue/storage structures within a processor.

It is another object of the present invention to provide such hardware outside the critical path of the basic fetch-dispatch-issue-execute-finish flow of instruction processing within a pipelined processor, thereby avoiding IPC degradation due to added processing latency.

It is another object of the present invention to provide a method and structure for a set of simple hardware heuristics that form the core of the "decision logic" used to determine "size up" or "size down" actions. The logic has built-in safeguards that limit IPC loss to a controllable factor.

It is another object of the present invention to provide a method showing that a downsized queue or storage structure results in reduced access latency for this queue structure. This aspect can be exploited to speed up the local clock or speed up execution using an asynchronous, self-timed implementation.

It is another object of the present invention to provide a method and structure for exploiting dynamic variability across application and workload executions that can be directly applied, with customized adaptations of the counter-based "monitor-and-control" hardware described in the exemplary embodiment, to other parts of a processor.

In order to achieve the above objects and goals, according to a first aspect of the invention, disclosed herein is disclosed a method of reducing power consumption in a microprocessor having at least one storage structure by dynamically measuring an activity of the storage structure(s) and controlling the size of the storage structure(s) based on that measurement.

According to a second aspect of the invention, disclosed herein is a method of reducing power consumption in a microprocessor having an out-of-order issue queue by measuring an activity of the issue queue over a predetermined period of time and controlling the size of the issue queue based on that measurement.

According to a third aspect of the invention, disclosed herein is a control circuit for a memory-based module in a computer including a sensor that detects and measures current activity of the memory-based module, a calculator to determine whether the measured current activity indicates that a size of the memory-based module should be changed, and a size controller to change the size of the memory-based module.

According to a fourth aspect of the invention, disclosed herein is a computer including a sensor detecting and measuring current activity of at least one memory-based module, a calculator determining whether the measured current activity indicates that a size of the memory-based module(s) should be changed, and a size controller changing the size of the memory-based module(s).

According to a fifth aspect of the invention, disclosed herein is an out-of-order issue queue in a microprocessor, where the out-of-order issue queue has a plurality of memory units, including a sensor detecting and measuring activity of the out-of-order issue queue, a calculator determining whether the measured current activity indicates that a size of the out-of-order issue queue should be changed, and a size controller changing the size of the out-of-order issue queue.

According to a sixth aspect of the invention, disclosed herein is a method of increasing speed of a storage structure having a self-timing structure in a microprocessor by dynamically measuring an activity of the storage structure and controlling the size of the storage structure based on the measurement.

According to a seventh aspect of the invention, disclosed herein is a storage structure in a computer including a sensor dynamically measuring an activity of the storage structure and a controller changing the size of the storage structure based on the measurement.

According to an eighth aspect of the invention, disclosed herein is a computer having at least one storage structure, where the storage structure includes a sensor dynamically measuring an activity of the storage structure and a controller changing a size of the storage structure based on the measurement.

According to a ninth aspect of the invention, disclosed herein is a storage medium tangibly containing a set of computer executable instructions for a method of reducing power consumption in a microprocessor having at least one storage structure where the method includes dynamically measuring an activity of the storage structure and controlling the size of the storage structure based on the measurement.

According to a tenth aspect of the invention, disclosed herein is a storage medium tangibly containing a set of computer executable instructions for a method of reducing power consumption in a microprocessor having an out-of-order issue queue, where the method includes measuring an activity of the issue queue over a predetermined period of time and controlling the size of the issue queue based on the measurement.

BRIEF DESCRIPTION OF THE DRAWINGS

The foregoing and other objects, aspects and advantages will be better understood from the following detailed description of a preferred embodiment of the invention with reference to the drawings, in which:

FIG. 8 shows results of adaptive CAM array energy and delay values;

FIG. 12 shows the power savings and CPI degradation for each benchmark as well as the overall average with different factor and cycle window values.

DETAILED DESCRIPTION OF A PREFERRED EMBODIMENT OF THE INVENTION

Figure 1:
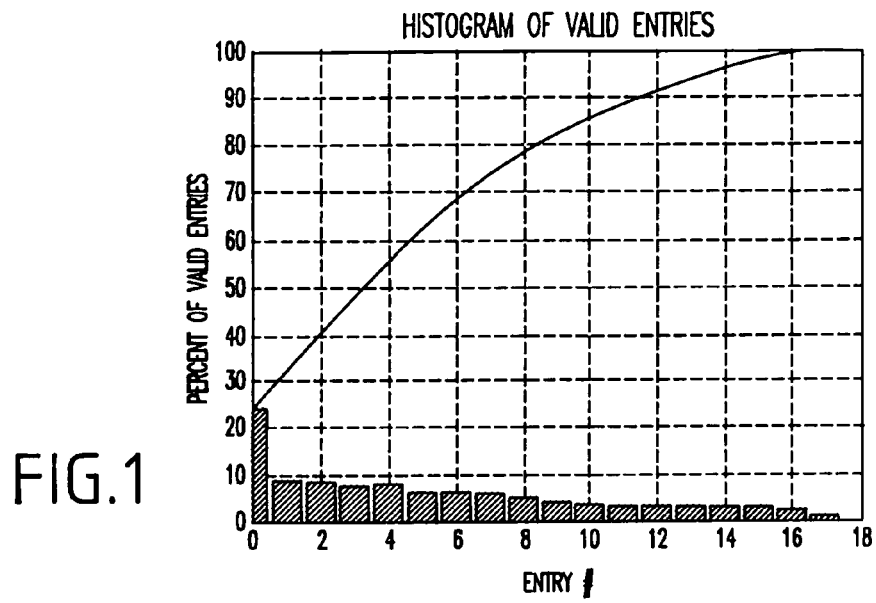
FIG. 1 is a histogram showing unnecessary power consumption in a non-adaptive queue.

Many superscalar microprocessors, such as the Alpha 21264™ and Mips R10000™, use a distributed issue queue structure, which may include separate queues for integer and floating point operations. For instance in the Alpha 21264™, the issue queue is implemented as flip-flop latch-based FIFO queues with a "compaction" strategy. That is, with every cycle the instructions in the queue are shifted to fill up any "holes" created due to prior-cycle issues. This makes efficient use of the queue resource, while also simplifying the wake-up and selection control logic. However, compaction entails shifting instructions around in the queue every cycle and, depending on the instruction word width, may therefore be a source of considerable power consumption. Studies have shown that overall performance is largely independent of what selection policy is used (oldest first, position based, etc.). As such, the compaction strategy may not be best suited for low power operation, nor is it critical to achieving good performance. So, in the research project underlying this invention, an initial decision was made to avoid compaction. Even if this means that the select arbitration must be performed over a window size of the entire queue, this is still a small price to pay compared to shifting multiple queue entries each cycle.

Due to the above considerations, the exemplary embodiment of the present invention uses a CAM/RAM based solution. Intuitively, a CAM/RAM would be inherently lower power consuming, due to its smaller area and because it naturally supports a "non-compaction" strategy. The CAM/RAM structure forms the core of our issue queue design. The op-code, destination register specifier, and other instruction fields such as the instruction tag are stored in the RAM. The source tags are stored in the CAM and are compared to the result tags from the execution stage every cycle. Once all source operands are available, the instruction is ready to issue provided its functional unit is available. The tag comparisons performed by the CAM and the checks to verify that all operands are available constitute the "wakeup" part of the issue unit operation.

While potentially consuming less power than a flip-flop based solution, the decision of using a CAM/RAM structure for the issue queue is not without its drawbacks. Standard CAM and RAM structures, as documented in the literature are in fact inherently power hungry as they need to precharge and discharge internal high capacitance lines and nodes for every operation. The CAM needs to perform tag matching operations every cycle. This involves driving and clearing high capacitance taglines, and also precharging and discharging high capacitance matchline nodes every cycle. Similarly, the RAM also needs to charge and discharge its bitlines for every read operation.

Our research on low-power issue queue designs has been focused on two aspects. The first approach attempts to innovate new circuit structures, which reduce power consumption in the basic CAM/RAM structure. In the second approach, a dynamic adaptation of the effective CAM/RAM structure is attempted by exploiting workload variability. This invention results from the work done for the second approach.

However, dynamic queue sizing can, if improperly implemented, degrade IPC performance as well. Part of the design challenge faced in this work was to ensure that the overall design choices do not impact performance significantly, while ensuring a substantial power reduction.

Non-adaptive designs, such as used in the R10000™, the current Power/PowerPC™ family processors, and the Alpha 21264™, use fixed-size resources and a fixed functionality across all program runs. Therefore, design choices are made to achieve best overall performance over a range of applications. However, an individual application whose requirements are not well matched to this particular hardware organization may exhibit poor performance. Even a single application run may exhibit enough variability that causes uneven use of the chip resources during different phases. Adaptive design ideas exploit the workload variability to dynamically adapt the machine resources to match the program characteristics. Such ideas can be used to increase overall performance by exploiting reduced access latencies in dynamically resized resources.

Non-adaptive designs are inherently power-inefficient as well. A fixed queue will waste power unnecessarily in the entries that are not in use. FIG. 1 shows utilization data for one of the queue resources within a high performance processor core when simulating the SPECint95 benchmarks. From this FIG. 1, it can be seen that the upper nine entries contribute to 80% of the valid entry count. Dynamic queue sizing clearly has the potential of achieving significant power reduction.

One option to save power is to clock-gate each issue queue entry on a cycle-by-cycle basis. However, clock gating alone does not address some of the largest components of the issue queue power such as the CAM taglines, the CAM/RAM precharge logic, and the CAM/RAM bitlines. So a scheme which allows shutting down the queue in "chunks" based on usage reduces these other power components and can produce significant additional power savings over clock gating. This idea forms the basis of the design described by this invention.

Figure 2:
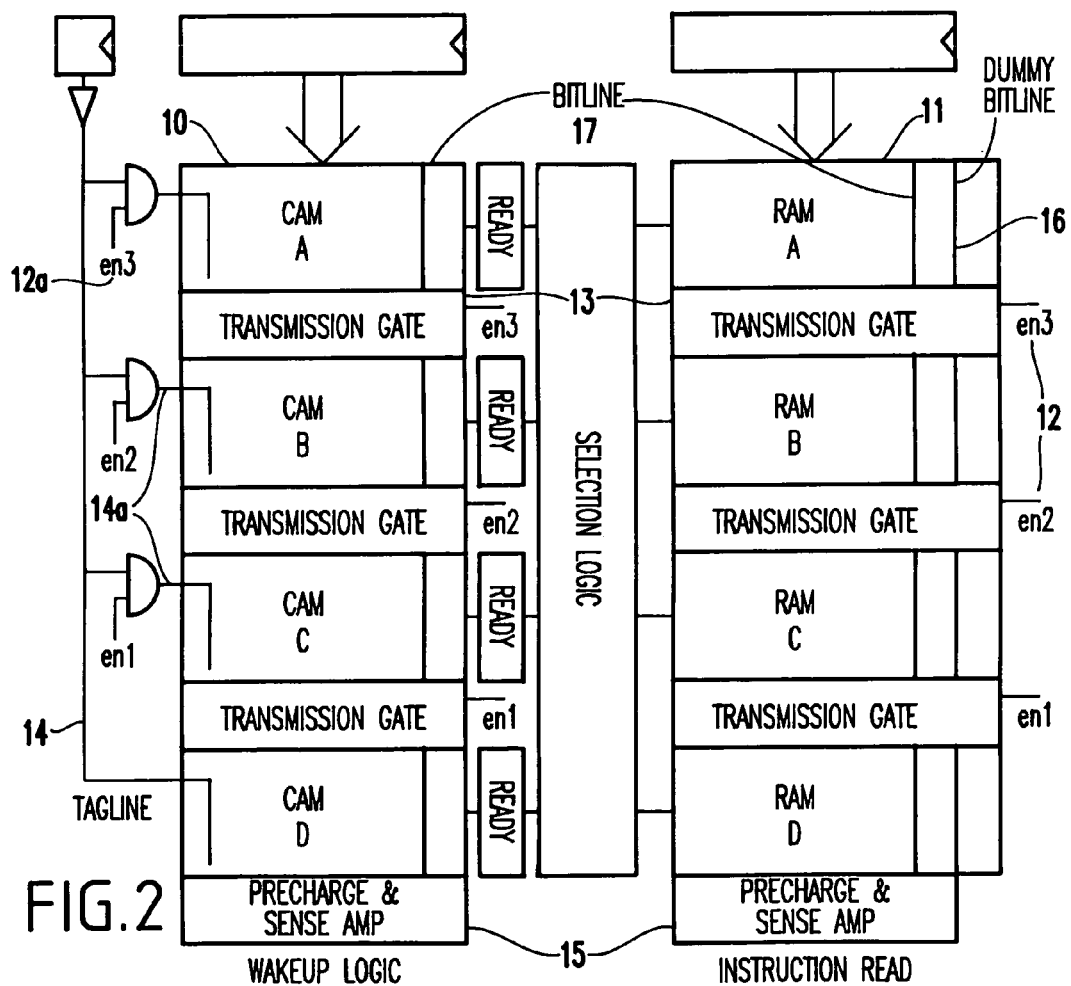
FIG. 2 is a block diagram of the adaptive CAM/RAM issue queue shown as an exemplary embodiment of the invention.

Referring now to FIG. 2, a high-level block diagram is shown of the adaptive CAM/RAM (content-addressable memory/random-access memory) structure used in the exemplary embodiment of the present invention. The basic CAM/RAM-based design implementing out-of-order issue of instructions, is already known in the prior art, so design details are not discussed herein.

Figure 4:
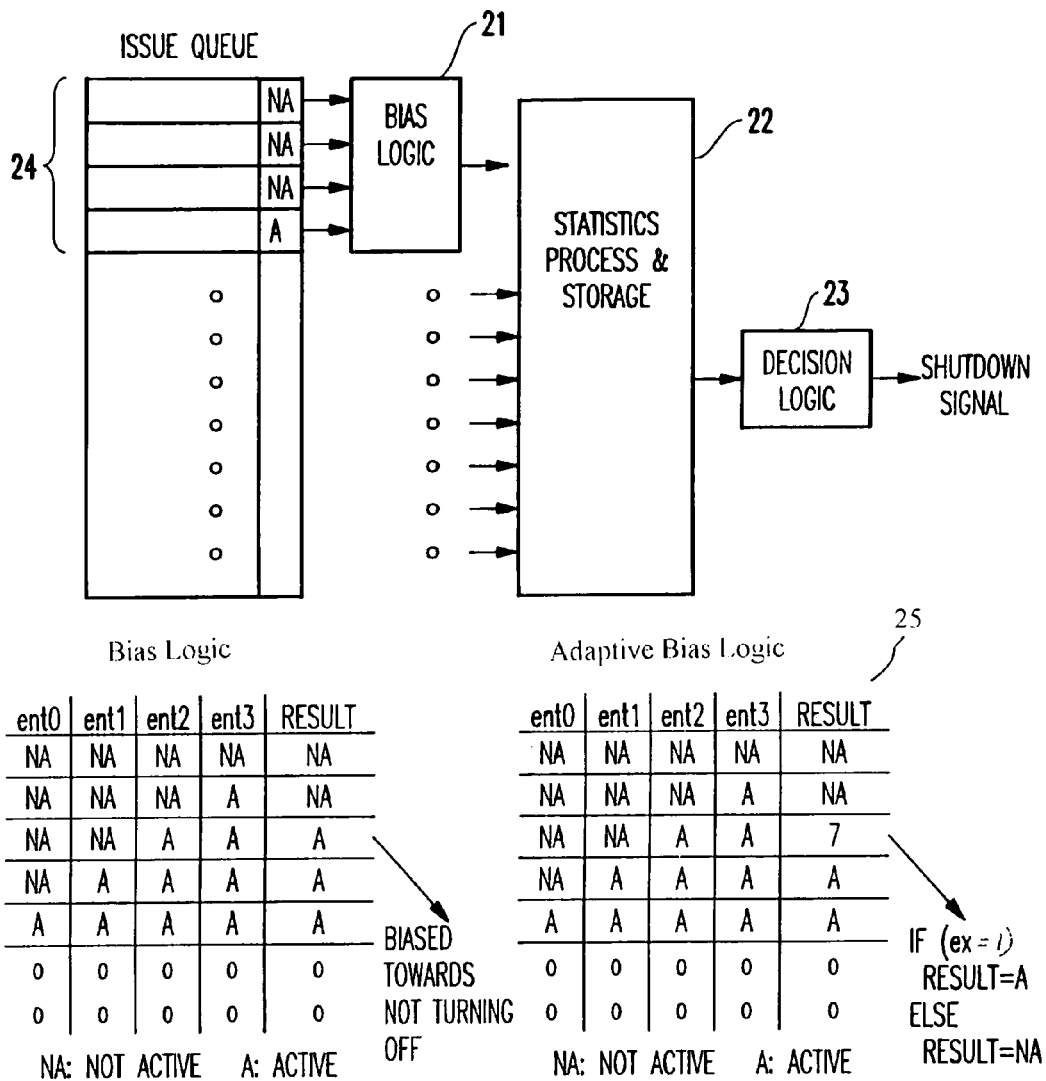
FIG. 4 is a block diagram of the shutdown logic and logic tables for bias logic for the exemplary embodiment.

For example, the paper by S. Palacharla and J. E. Smith, "Complexity-effective superscalar processors," Proceedings of the International Symposium on Computer Architecture, 1997, pp. 206-218, June 1997. FIG. 4 within that paper sketches the basic logic function and mechanism used in the tag-matching and wake-up mechanism used in the CAM part of an issue queue. A general reference on the basic CAM circuit structure is: Kenneth J. Schultz, "Content-addressable memory core cells: a survey," in INTEGRATION, the VLSI Journal, vol. 23, 1997, pp. 171-188, Elsevier Press. The RAM part is a standard random access memory that stores the actual operands and other descriptors of the waiting instructions.

The effective sizes of the CAM arrays 10 or RAM arrays 11 can be changed at run-time by adjusting the enable inputs 12 that control the transmission gates 13. For our circuit-level implementation and simulation study, a 32-entry issue queue was assumed. This is partitioned into four 8-entry chunks (CAM A/RAM A through CAM D/RAM D).

For the taglines, a separate scheme is employed in order to avoid a cycle time impact. A global tag-line 14 is traversed through the CAM array and its local tag-lines 14a are enabled/disabled depending on the control inputs 12a. The sense amplifiers and precharge logic 15 are located at the bottom of both arrays. A special sensing scheme discussed later is employed.

Another feature of the design of the exemplary embodiment of the present invention is that these CAM and RAM structures are implemented as self-timed blocks. The timing of the structure is performed via an extra dummy bitline 16 within the datapath of CAM/RAM structures, as shown in FIG. 2. No corresponding dummy bitlines are needed in the CAM blocks if all the data necessary is stored in and read from the RAM. This dummy bitline have the same layout as the real bitlines 17 and are as analogous as possible in every sense. The self-timed operation is achieved by making the control of the sense amplifier 15 self-timed. For this purpose, a logical zero is stored in the dummy cells. A read operation from these cells creates a logical one to zero transition that controls the set input of the sense amplifier. Note that the dummy bitline is precharged each cycle as the other bitlines. This work assumes a latching sense amplifier that is able to operate with inputs near Vdd as shown in FIG. 2-a. When the set input is high, a small voltage difference from the memory cell comes through the NMOS pass gates. When the set signal goes low, the cross-coupled devices amplify this difference to a full rail signal as the pass gates turn off to prevent the cross-coupled structure from being loaded by the bitlines. When the issue queue size is 8, it implies a faster access time because of the 24 disabled entries. A schematic of the sense-amplifier is shown in FIG. 2-a.

The self-timed sense amplifier structure takes advantage of this by employing the dummy bitline to allow faster operation. The dummy bitline enables the sense amplifiers at the exact time the data become available. Simulations show that one may achieve up to 56% decrease in the cycle time of the CAM array read by this method. So going down to smaller number of entries not only saves energy but also results in less cycle time, as in prior work related to adaptive cache designs.

One way of exploiting this reduced cycle time in the issue queue is to increase the local clocking rate for the issue queue; however, the power-performance efficiency benefit of this approach is questionable. Even if we consider performance alone, the benefit is still questionable, especially if one considers the overhead of dynamic change or adaptation of clock frequencies. Hence, we shall not consider this approach in our design.

Another, more useful way of exploiting the above is to reduce the supply voltage (Vdd) for the active issue queue structure, so that the elongated access cycle is now compatible with the processor clock frequency. This feature will result in further power savings in the issue queue during its "downsized" periods. The dynamic voltage scaling circuitry required to accomplish this are an orthogonal mechanism to the basic size adaptation methods described in this invention.

Shutdown Logic

Figures 2A, 3:
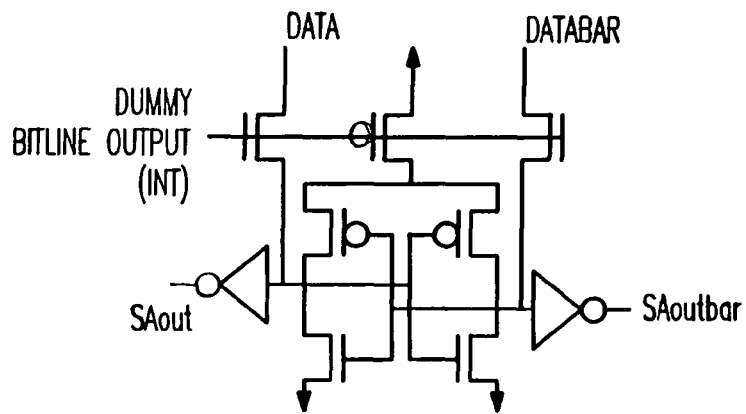
FIG. 2a shows the schematic of the latching sense-amplifier.
FIG. 3 shows results of a study of relative transistor count for the shutdown logic of the exemplary embodiment.

A primary goal in designing the shutdown logic is not to add too much overhead to the conventional design in terms of transistor count and energy dissipation. A study of the transistor count of the invention, as shown in FIG. 3, shows that the extra logic adds only a small amount of complexity (less than 3% additional transistors) to the overall issue queue. Simulations using AS/X show that this extra circuitry dissipates 3% of the energy dissipated by the whole CAM/RAM structure on average.

FIG. 4 illustrates the high-level operation of the shutdown logic. It includes "bias logic" 21 at the first stage followed by the "statistics process&storage" 22 stage. The activity information is first filtered by the bias logic 21 and then it is fed to the process&storage 22 stage where the information is fed to counters. At the end of the cycle window, this data passes through the decision logic 23 to generate the corresponding control inputs. The 32 entry issue queue is partitioned into 8-entry chunks which are separately monitored for activity. The bias logic block monitors the activity of the issue queue in 4-entry chunks 24. This scheme is intentionally employed to decrease the fan-in of the bias logic.

The bias logic mechanism 21 simply gathers the activity information over four entries and averages them over each cycle. The activity state of each instruction may be inferred from the "active flag" of that particular queue entry. One particular state of interest is when exactly half of the entries in the monitored chunk are active. One alternative is to have it statically biased to infer that the whole chunk is either active or not active in this particular case. Another approach can be dynamically changing this choice by making use of an extra logic signal variable. (See Adaptive Bias Logic 25 in FIG. 4).

Figure 5:
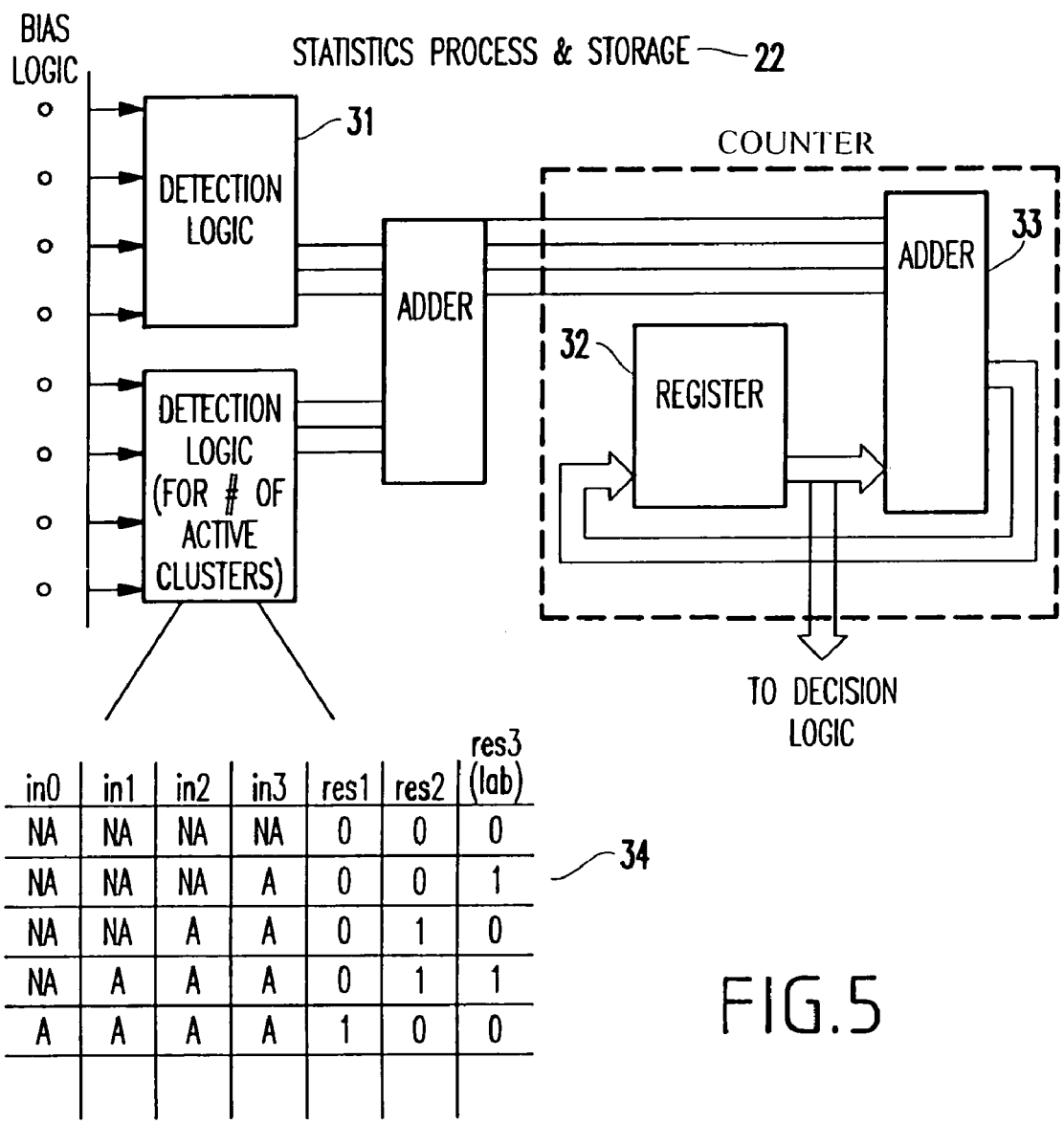
FIG. 5 is a block diagram of the statistics process and storage stage for the shutdown logic.

The statistics process&storage stage 22, which is shown in more detail in FIG. 5 is comprised of two different parts. The detection logic 31 provides the value that will be added to the final counter. It gathers the number of active chunks 24 (FIG. 4) from the bias logic outputs and then generates a certain value. That is, if there are two active four-entry chunks, the detection logic will generate binary two to add to the final counter. The second part, which is the most power hungry is the flip-flop 32 and adder pair 33 (forming the counter). Each cycle, this counter is incremented by the number of active clusters four-entry chunks). In this figure one can see the function 34 of the detection logic. The zeros in the inputs correspond to the non-active clusters and the ones to active clusters. The result section shows which value in binary should be added. For 32 entries, we need two of these detection circuits and a small three bit adder are required to produce the counter input. One of the detection logic units covers the upper 16 entries and the other one covers the bottom 16 entries.

The Decision Logic for Queue Size Adaptation

The decision logic that is part of the queue size adaptation control, determines when to size "up" versus "down". Its input is based on the information collected by the "Statistics Process and Storage" logic (FIG. 4). There are many variations of this logic that are candidates for implementation in an actual processor design. A very simple mechanism for the decision logic in pseudocode is listed below:

if (present_IPC<factor*last_IPC)
increase_size;
else if (counter<threshold_1)
decrease_size;
else if (counter<threshold_2)
retain_current_size;
else increase_size;

In the above algorithm, IPC refers to Instructions Per Cycle, a common metric of microarchitecture level performance measured in a processor.

At the end of a cycle window, there are four possible actions. The issue queue size is ramped up to next larger queue size of the current one if the present IPC is a factor lower than the last IPC during the last cycle window. This is a guard mechanism that attempts to limit the performance loss of adaptation. Otherwise, depending on the comparison of counter values with certain threshold values, the decision logic may do the following: (i) increase queue size by enabling higher order entries; (ii) retain the current size; or (iii) decrease the size by disabling the highest order entries. Note that a simple NOR of all active instructions in a queue chunk ensures that all such entries are issued before the chunk is disabled.

Figure 6:
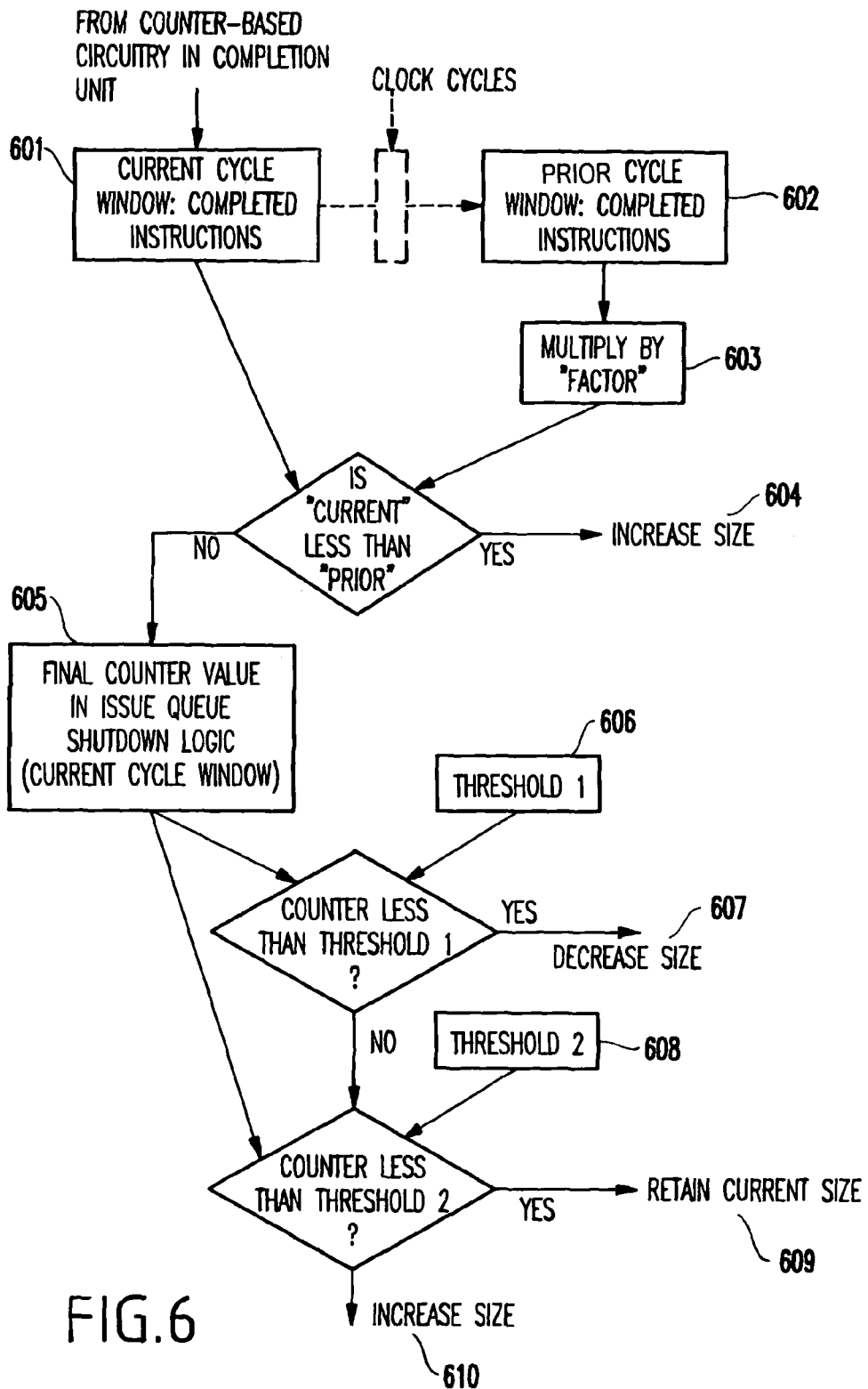
FIG. 6 is a flowchart of an exemplary re-sizing algorithm.

A flowchart implementing this algorithm is shown in FIG. 6. In step 601 the IPC statistics from the current cycle window have just been completed as "current". In step 603 the results from the previous cycle window 602 are multiplied by "factor" to become "prior". In step 604, when "current" is less than "prior" the issue queue is ramped up to next larger queue size of the current one. In step 605, if "current" is not less than "prior", the contents of the counter are compared with threshold 1 (item 606) and the size reduced in step 607 if the counter is less than threshold 1. If the counter is not less than threshold 1, it is compared with threshold 2 (item 608). The queue size remains the same (step 609) if counter is less than threshold 2. Else, in step 610, the queue size is increased.

Summary of Experimental Results

Based on circuit-level simulations of the designed adaptive issue queue structure, the following results were obtained:

The added extra control circuitry consumes less than 3% of the energy consumed by the whole CAM/RAM structure on average.

The energy reduction within a cycle window is essentially linear in the number of queue chunks (blocks) that are shut down during that window. For a 32-entry queue, the exact energy reduction on resizing to an 8-entry queue was measured to be 70% of the full queue. Self-timed techniques embedded in the adaptive scheme were found to be capable of providing a 56% decrease in access time of the CAM array read of issue queue when it is resized down to 8 entries.

Simulation Based Results

In this section, circuit-level data and simulation results are presented. Later, microarchitecture-level simulation results are presented that demonstrate the workload variability in terms of issue queue usage.

Circuit-Level Data

Figure 7:
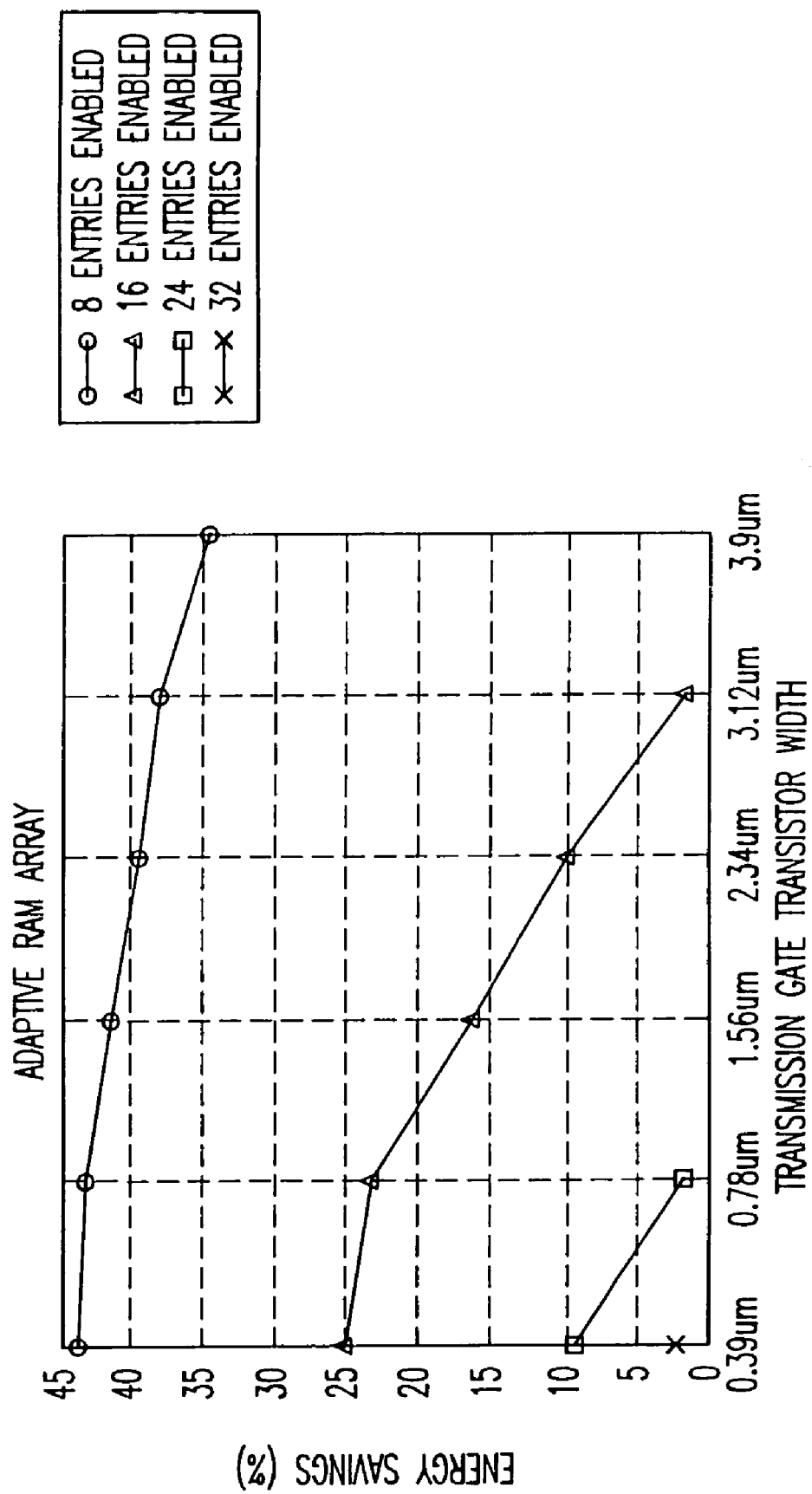
FIG. 7 shows results of adaptive RAM array energy savings.

FIG. 7 shows the energy savings (from AS/X™ simulations) achieved with an adaptive RAM array. Note that in this figure only positive energy savings numbers are presented. There are several possible energy/performance tradeoff points depending on the transistor width of the transmission gates. A larger transistor width results in less cycle time impact, although more energy is dissipated. The cycle time impact of the additional circuitry did not affect the overall target frequency of the processor across all cases. This was true also for the CAM structure.

By going down to 0.39 um transistor width, one can obtain energy savings of up to 44%. These numbers are inferred from the energy dissipation corresponding to one read operation of a 32-entry conventional RAM array and that of various alternatives of the adaptive RAM array. The size of the queue is varied over the value points: 8, 16, 24 and 32. An interesting feature of the adaptive design is that it achieves energy savings even with 32 entries enabled. This is because the transmission gates in the adaptive design reduce the signal swing therefore resulting in less energy dissipation.

The adaptive CAM array energy and delay values are presented in FIG. 8 for various numbers of enabled entries and transmission gate transistor widths. These values account for the additional circuitry that generates the final request signal for each entry (input to the arbiter logic). With this structure, a 75% savings in energy dissipation is achieved by downsizing from 32 entries to 8 entries. It should be noted that a 32 entry conventional CAM structure consumes roughly the same amount of energy as the adaptive CAM array with 32 entries. Furthermore, the cycle time of the CAM array read is reduced by 56%. Because the CAM array dissipates ten times more energy than the RAM array (using 2.34 um transmission gate transistor width) a 75% energy savings in the CAM array corresponds to a 70% overall issue queue energy savings. Shutdown logic overhead is included in these studies.

Microarchitecture-Level Simulation and Results

The work reported thus far demonstrates the potential power savings via dynamic adaptation of the issue queue size. In other words, a specific, circuit-level solution that allows the possibility of such adaptation has been designed. And it has been quantified through simulation, the energy savings potential when the queue is sized downwards. In these simulations, the overhead of the extra transistors which result from the run-time resizing hardware has been factored in.

In this section, the following issues are addressed: (a) what are some of the alternate algorithms one may use in implementing the "decision logic" referred to earlier. That is, how and at what cycle windows does one decide whether to size up or down? (b) What are the scenarios under which one scheme may win over another? (c) How do the alternate resizing algorithms perform from a performance and power perspective, in the context of a given workload?

The issue unit, in conjunction with the upstream fetch/decode stages, can be thought of as a "producer." It feeds the subsequent execution unit(s) which act as consumer(s). Assuming, for the moment, a fixed (uninterrupted) fetch/ decode process (bandwidth), the issue queue will tend to fill up when the issue logic is unable to sustain a matching issue bandwidth. This could happen because: (a) the program dependency characteristics are such that the average number of "ready" instructions detected each cycle is less than the fetch bandwidth seen by the receiving end of the issue queue; or, (b) the execution pipe backend ("the consumer") experiences frequent stall conditions unrelated to register data dependencies, causing issue slot "holes." This latter condition (b) could happen due to exception conditions, e.g., data normalization factors in floating point execution pipes, or address conflicts of various flavors in load/store processing, etc. On the other hand, the "issue-active" part of the queue will tend to be small, around a value equal to the fetch bandwidth or less, if the consuming issue-execute process is faster than or equal to the producing process.

Obviously, this would happen during stretches of execution when the execution pipe stalls are minimal and the issue bandwidth is maximal, as plenty of "ready" instructions are available for issue each cycle. However, one may need a large issue queue window just to ensure that enough "ready" instructions are available to maximize the issue bandwidth. On the other hand, if the stretch of execution involves a long sequence of relatively independent operations, one may not need a large issue queue. So, it should be clear, that even for this trivial case, where an uninterrupted flow of valid instructions into the issue queue is assumed, the decision to resize the queue and in the right direction, up or down, can be complicated. This is true even if the consideration is limited only to CPI performance, i.e., if the objective is to always have 'just enough" issue queue size to meet the execution needs and dependency characteristics of the variable workload. If the emphasis is more on power reduction, then one can perhaps get by with a naive heuristic for size adaptation, provided the simulations validate that the average IPC loss across workloads of interest is within acceptable limits. The notation CPI is just the inverse of IPC. Both are commonly used in the literature.

Figure 9:
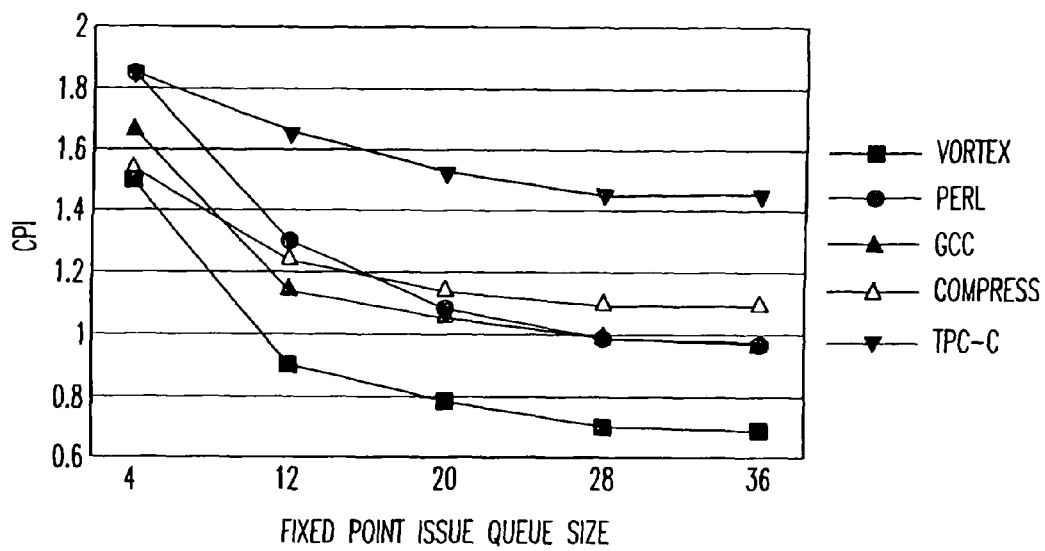
FIG. 9 shows the CPI sensitivity to issue queue size.
Figure 10:
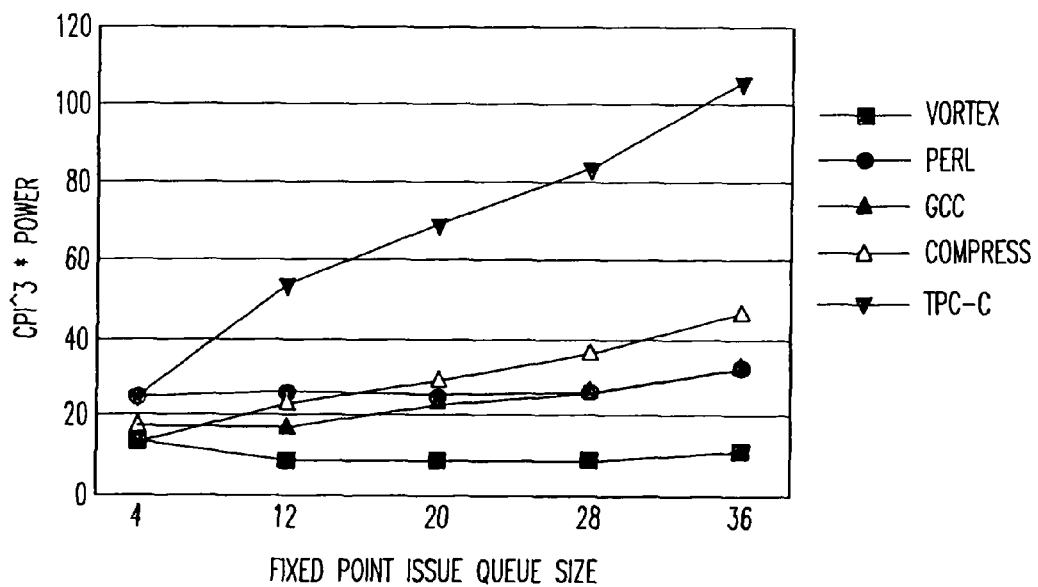
FIG. 10 shows $CPI^3$*power variation with issue queue size.

To illustrate the basic tradeoff issues, first, data is provided in FIG. 9 that shows the variation of CPI with fixed-point issue queue size across several SPECint95 benchmarks and a TPC-C trace. This experiment was done by modeling a high performance processor core using a research execution-driven simulator. A single fixed-point issue queue (non-clustered) was used in feeding the integer and load-store units in the machine. This is because, in the circuit implementation for a prototype low power issue-execute unit, a single centralized issue queue with a maximum size of 32 entries was assumed. The data in FIG. 9 shows that for most of the benchmarks simulated, there is considerable variation of CPI with issue queue size between 4 and 12; and, in some cases even between 12 and 28. Assuming a power variation profile which is essentially linear in the number of entries, see circuit-level simulation data reported earlier in FIG. 8, the power-performance variation with issue queue size is shown in FIG. 10. In this figure, the metric of choice in measuring power-performance efficiency is assumed to be $(CPI)^3$*watts. [Note: CPI raised to the cubic power]. This corresponds to energy*(delay)$^2$, which is felt to be most appropriate for server-class microprocessors that have performance as the primary metric.

FIG. 10 shows that for TPC-C, the power-performance inefficiency metric ($(cpi)^3$*power) increases significantly with increasing queue size. However, for vortex, the efficiency actually improves in going from 4 to 12 and remains almost constant after that. Thus, depending on the CPI sensitivity curve for a given program, see FIG. 9, the dynamic queue size adaptation algorithm may or may not result in overall increase in operating efficiency. However, even with a relatively simple heuristic for queue size change, one may achieve substantial net power reduction, without significant CPI increase.

Figure 11:
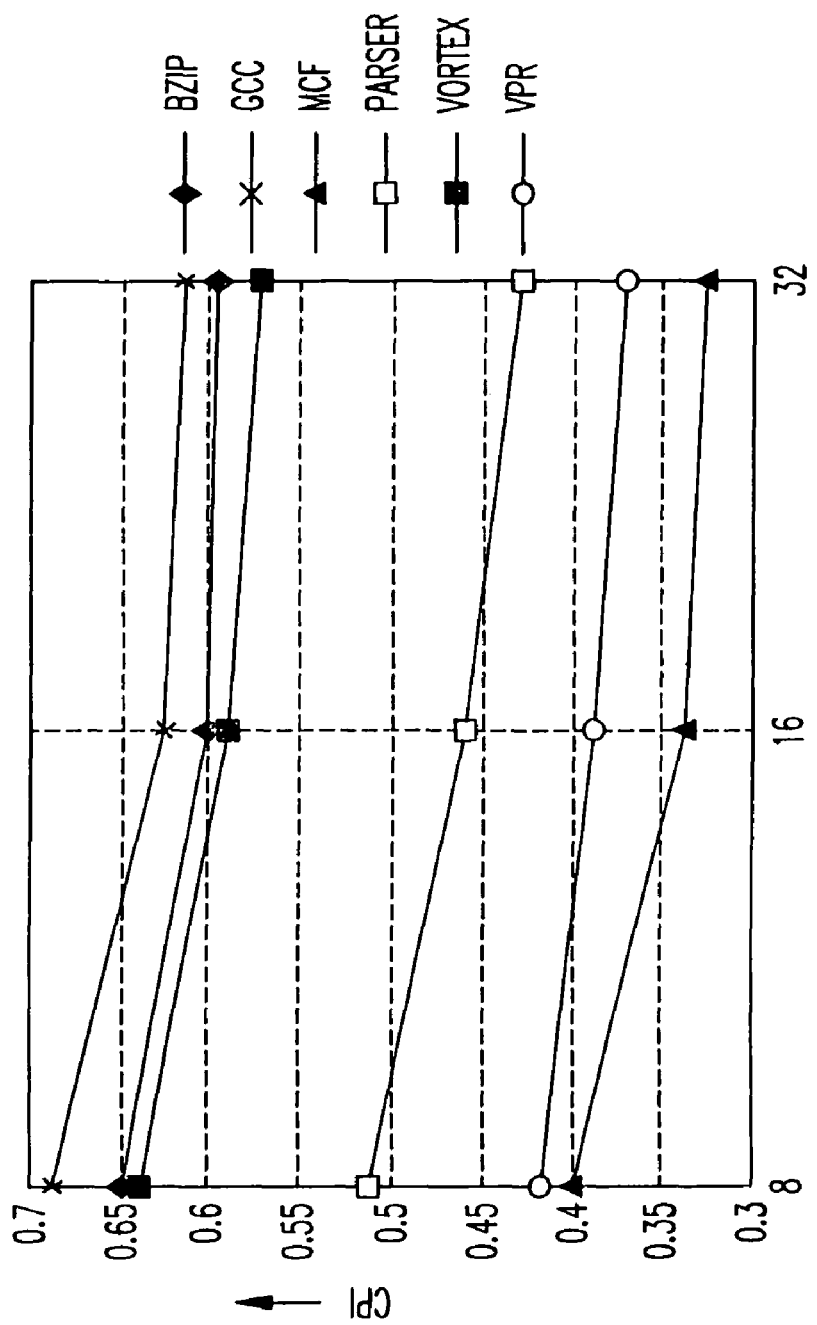
FIG. 11 shows the variation of CPI with integer issue queue size across several SPEC2000 integer benchmarks.

Also to illustrate the basic tradeoff issues for SPEC2000 integer benchmarks, data is provided in FIG. 11 that shows the variation of CPI with integer issue queue size. A SimpleScalar-3.0™ was used to simulate an aggressive 8-way superscalar out-of-order processor. In the simulator, separate issue queues were modeled as integer and floating point queue. The data in FIG. 11 shows that for most of the benchmarks simulated, there is considerable variation in CPI as integer issue queue size varies between 8 and 32. In order to gain insight into the potential of our adaptive issue queue, the algorithm was implemented in SimpleScalar as discussed earlier. The algorithm was analyzed with different factor and cycle window values to observe the various power performance tradeoffs. Each benchmark was run for the first 400 million instructions.

The dynamic algorithm picks the appropriate size for the next cycle window by estimating the usage in the last cycle window, and comparing this value with certain threshold values. The algorithm also compares the IPC of the last interval with present interval IPC. For this purpose, the configurations were also analyzed with different factor values. Threshold values are adjusted such that, if the issue queue utilization for a certain size is at the border value of its maximum size (e.g., for an issue queue size of 8 entries, the border is 7 entries) then the issue queue size is ramped up to the next larger size. FIG. 12 shows the power savings and CPI degradation for each benchmark as well as the overall average with different factor and cycle window values. These different factor and cycle window values represent different power/performance tradeoff points. Ideally, the values of "cycle window" and "factor" should be hardware (or software) programmable parameters, that can be adjusted periodically during execution. This can result in picking the best power-performance tradeoff points with changing phases (characteristics) of the input workload. In other words, the dynamic adjustment of "cycle window" and "factor" can add a finer grain of adaptivity to the resizing and control mechanism described in this document.

To estimate the power savings, a power variation profile was assumed which is essentially linear in the number of entries, based on the circuit-level simulation data reported earlier in FIG. 8. The shutdown logic overhead was also taken into account. CPI degradation and power savings are both relative to a fixed 32-entry integer issue queue.

Figure 13:
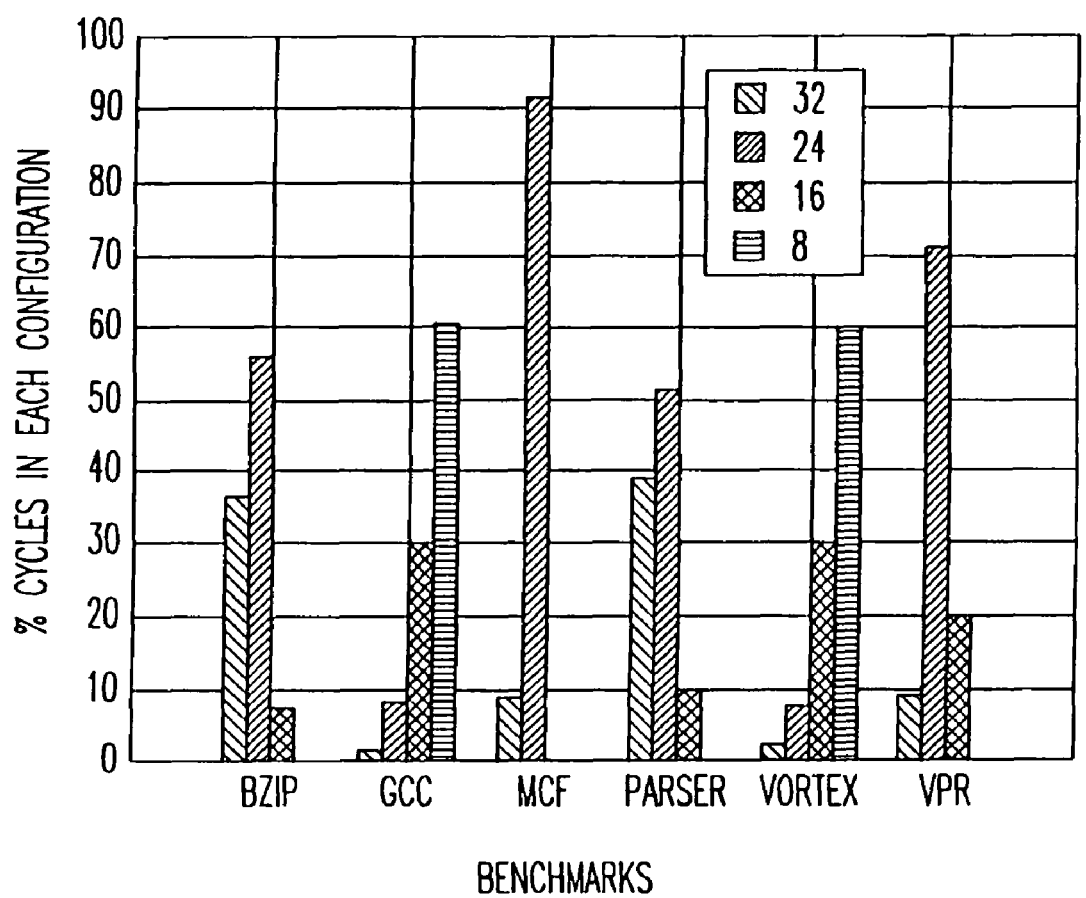
FIG. 13 shows what percentage of the time each queue size was used with the dynamic algorithm with factor=0.7 and cycle window=4K.

The results from FIG. 13 demonstrate the broad range of workload variability. For mcf, the full 24 entry is mostly used throughout its entire execution whereas for vortex and gcc, only 8 and 16 entries are largely used. For bzip, the algorithm almost equally chooses issue queue sizes of 32,24 entries. For parser, the 32 and 24 entry issue queue configurations dominate whereas for vpr, 24 and 16 entries are largely used. On average, for this particular cycle window and factor values (cycle window=4K, factor=0.7) this naive algorithm provides a 34% decrease in the issue queue power (60% maximum) with a CPI degradation of just over 3%.

CONCLUSION

The invention depicts a practical, circuit-level "monitor-and-control" hardware scheme to effect dynamic resizing of queue/storage structures within a processor. Such hardware is "on the side", i.e., not in the critical path of the basic fetchdispatch-issue-execute-finish flow of instruction processing within a pipelined processor. As such, the IPC degradation due to added processing latency is avoided.

The invention describes a set of simple hardware heuristics that form the core of the "decision logic" used to determine "size up" or "size down" actions. The logic has built-in safeguards that limit IPC loss to a controllable factor.

The invention shows that a downsized queue or storage structure results in reduced access latency for this queue structure. This aspect can be exploited to speed up the local clock or speed up execution using an asynchronous, self-timed implementation.

Issue queues in out-of-order super scalar processors are known to consume a significant fraction of the core chip power. A preferred embodiment, chosen for description in this invention, is therefore the issue queue. However, with customized adaptations of the counter-based "monitor-and-control" hardware, this invention can be directly applied to other parts of a processor, with the goal of exploiting dynamic variability across application and workload executions.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of reducing power consumption in a microprocessor having at least one storage structure, said method comprising:
    dynamically measuring an activity of said at least one storage structure; and
    controlling a size of said at least one storage structure based on said measurement,
    wherein no more than approximately 3% additional circuitry is added to said at least one storage structure for said reducing power consumption, said additional circuitry being measured in terms of a number of additional transistors added to said at least one storage structure to achieve said activity measuring and said size controlling, said reducing power consumption being relative to a power consumption if said at least one storage structure operates with no size reduction.

2. The method of claim 1, wherein said storage structure comprises a plurality of blocks, and said dynamic measurement of activity and said size control are executed in increments of said blocks.

3. The method of claim 2, wherein a size of said block is adjustable.

4. The method of claim 1, wherein said dynamic measurement of activity comprises measuring an activity of said storage structure over a predetermined period of time.

5. The method of claim 4, wherein said period of time comprises a cycle window that is variable and controllable.

6. The method of claim 1, wherein said dynamic measurement of activity is based on measuring CPI, where CPI=Cycles per instruction, which is the inverse of IPC, where IPC=instructions per cycle.

7. The method of claim 1, wherein said at least one storage structure comprises at least one of an out-of-order issue queue, a reorder buffer, a branch prediction table module, a cache, a TLB (translation look aside buffer) memory, and a memory directory structure.

8. The method of claim 1, wherein said dynamic measuring comprises providing a statistical measurement.

9. The method of claim 1, further comprising:
    providing a guard mechanism to avoid a performance shortfall.

10. The method of claim 9, wherein said guard mechanism comprises a predetermined lower threshold used for decisions implementing a decrease in size of said at least one storage structure.

11. A method of reducing power consumption in a microprocessor having an out-of-order issue queue, said method comprising:
    measuring an activity of said issue queue over a predetermined period of time; and
    controlling a size of said issue queue based on said measurement,
    wherein no more than approximately 3% additional circuitry is added to said out-of-order issue queue for said reducing power consumption, said additional circuitry being measured in terms of a number of additional transistors added to said out-of-order issue queue to achieve said activity measuring and said size controlling, said reducing power consumption being relative to a power consumption if said out-of-order issue queue operates with no size reduction.

12. The method of claim 11, wherein said issue queue comprises a plurality of blocks, each said block comprising a plurality of memory units, and said measurement of activity and said size control are executed in increments of said blocks.

13. The method of claim 12, wherein a size of said block is adjustable.

14. A control circuit for a memory-based module in a computer, comprising:
    a sensor that detects and measures a current activity of said memory-based module;
    a calculator to determine whether said measured current activity indicates that a size of said memory-based module should be changed; and
    a size controller to change said size of said memory-based module,
    wherein no more than approximately 3% additional circuitry is added to said memory-based module for said reducing power consumption, said additional circuitry being measured in terms of a number of additional transistors added to said memory-based module to achieve said activity measuring and said size controlling, said reducing power consumption being relative to a power consumption if said memory-based module operates with no size reduction.

15. The control circuit of claim 14 for a memory-based module in a computer, wherein said memory-based module comprises at least one of an out-of-order issue queue, a reorder buffer, a branch prediction table module, a cache, a TLB (translation look aside buffer) memory, and a memory directory structure.

16. A computer comprising:
    a sensor detecting and measuring a current activity of at least one memory-based module;
    a calculator determining whether said measured current activity indicates that a size of said at least one memory-based module should be changed; and
    a size controller changing said size of said at least one memory-based module,
    wherein no more than approximately 3% additional circuitry is added to said at least one memory-based module for said reducing power consumption, said additional circuitry being measured in terms of a number of additional transistors added to said at least one memory-based module to achieve said activity measuring and said size controlling, said reducing power consumption being relative to a power consumption if said at least one memory-based module operates with no size reduction.

17. The computer of claim 16, wherein said at least one memory-based module comprises at least one of an out-of-order issue queue, a reorder buffer, a branch prediction table module, a TLB (translation look aside buffer) memory, a cache, and a memory directory structure.

18. An out-of-order issue queue in a microprocessor, said out-of-order issue queue having a plurality of memory units, said out-of-order issue queue comprising:
a sensor detecting and measuring current activity of said out-of-order issue queue;
a calculator determining whether said measured current activity indicates that a size of said out-of-order issue queue should be changed; and
a size controller changing said size of said out-of-order issue queue,
wherein no more than approximately 3% additional circuitry is added to said out-of-order issue queue for said reducing power consumption, said additional circuitry being measured in terms of a number of additional transistors added to said out-of-order issue queue to implement said sensor, said calculator, and said size controller, said reducing power consumption being relative to a power consumption if said out-of-order issue queue operates with no size reduction.

19. The out-of-order issue queue of claim 18, further comprising:
a plurality of blocks, each said block comprising a plurality of said memory units, and said measurement of activity and said size control are executed in increments of said blocks.

20. The out-of-order issue queue of claim 19, wherein each said block comprises a CAM/RAM structure, where CAM means "content-addressable memory" and RAM means "random-access memory".

21. The out-of-order issue queue of claim 19, further comprising:
a global tagline providing a global enable signal for said plurality of blocks; and
a plurality of local taglines, each said local tagline respectively providing an enable signal for each of said plurality of blocks.

22. The out-of-order issue queue of claim 19, further comprising:
a plurality of transmission gates, each said transmission gate respectively controlling a bitline signal for each of said plurality of blocks.

23. The out-of-order issue queue of claim 22, wherein a size of a block is controlled by enabling said transmission gates and such size is variable.

24. The out-of-order issue queue of claim 19, further comprising:
a dummy bitline structure providing a self-timing of each said block by enabling a sense amplifier at an exact time data is available.

25. The out-of-order issue queue of claim 24, wherein a voltage level to said out-of-order issue queue is controlled as based on said size of said out-of-order issue queue.

26. The out-of-order issue queue of claim 19, wherein a size of said block is adjustable.

27. The out-of-order issue queue of claim 18, wherein said plurality of memory units comprise a CAM/RAM structure, where CAM means "content-addressable memory" and RAM means "random-access memory".

28. A method of increasing speed of a storage structure having a self-timing structure in a microprocessor, comprising:
dynamically measuring an activity of said storage structure; and
controlling a size of said storage structure based on said measurement,
wherein no more than approximately 3% additional circuitry is added to said storage structure for said reducing power consumption, said additional circuitry being measured in terms of a number of additional transistors added to said storage structure to achieve said activity measuring and said size controlling, said reducing power consumption being relative to a power consumption if said storage structure operates with no size reduction.

29. A storage structure in a computer, comprising:
a sensor dynamically measuring an activity of said storage structure; and
a controller changing a size of said storage structure based on said measurement,
wherein no more than approximately 3% additional circuitry is added to said at least one storage structure for said reducing power consumption, said additional circuitry being measured in terms of a number of additional transistors added to said at least one storage structure to implement said sensor and said controller, said reducing power consumption being relative to a power consumption if said storage structure operates with no size reduction.

30. A computer having at least one storage structure, said at least one storage structure comprising:
a sensor dynamically measuring an activity of said at least one storage structure; and
a controller changing a size of said at least one storage structure based on said measurement,
wherein no more than approximately 3% additional circuitry is added to said at least one storage structure for said reducing power consumption, said additional circuitry being measured in terms of a number of additional transistors added to said at least one storage structure to implement said sensor and said controller, said reducing power consumption being relative to a power consumption if said at least one storage structure operates with no size reduction.

31. A tangible storage medium tangibly containing a set of computer executable instructions for a method of reducing power consumption in a microprocessor having at least one storage structure, said method comprising:
dynamically measuring an activity of said at least one storage structure; and
controlling a size of said at least one storage structure based on said measurement,
wherein no more than approximately 3% additional circuitry is added to said at least one storage structure for said reducing power consumption, said additional circuitry being measured in terms of a number of additional transistors added to said at least one storage structure to achieve said activity measuring and said size controlling, said reducing power consumption being relative to a power consumption if said at least one storage structure operates with no size reduction.

32. A tangible storage medium tangibly containing a set of computer executable instructions for a method of reducing power consumption in a microprocessor having an out-of-order issue queue, said method comprising:

measuring an activity of said issue queue over a predetermined period of time; and controlling a size of said issue queue based on said measurement, wherein no more than approximately 3% additional circuitry is added to said out-of-order issue queue for said reducing power consumption, said additional circuitry being measured in terms of a number of additional transistors added to said out-of-order issue queue to achieve said activity measuring and said size controlling, said reducing power consumption being relative to a power consumption if said out-of-order issue queue operates with no size reduction.

* * * * *